United States Patent [19]
Aronoff et al.

[11] Patent Number: 5,331,571
[45] Date of Patent: Jul. 19, 1994

[54] TESTING AND EMULATION OF INTEGRATED CIRCUITS

[75] Inventors: Alan P. Aronoff, Pleasanton; Marc S. Birnkrant, Palo Alto; Osamu Matsushima, San Jose, all of Calif.; Kyosuke Sugishita, Kanagawa, Japan; Hisaharu Oba, Sunnyvale, Calif.; Katta N. Reddy, Milpitas, Calif.; Richard I. Olsen, Los Gatos, Calif.; Brent N. Dichter, Boulder Creek, Calif.

[73] Assignee: NEC Electronics, Inc., Mountain View, Calif.

[21] Appl. No.: 919,417

[22] Filed: Jul. 22, 1992

[51] Int. Cl.⁵ .................... G06G 7/48; G06F 15/00
[52] U.S. Cl. ........................ 364/490; 364/578; 324/73.1; 365/201; 307/465; 371/22.1
[58] Field of Search ........... 364/490, 578, 200, 900, 364/300; 371/21.1, 22.1; 324/73.1, 158, 73; 365/201, 189.03; 307/465, 443

[56] References Cited
U.S. PATENT DOCUMENTS

| | | | |
|---|---|---|---|
| 4,621,339 | 11/1986 | Wagner et al. | 364/900 |
| 4,695,968 | 9/1987 | Sullivan, II et al. | 364/578 |
| 4,896,296 | 1/1990 | Turner et al. | 365/189.08 |
| 5,032,783 | 7/1991 | Hwang et al. | 324/73.1 |
| 5,072,138 | 12/1991 | Slemmer et al. | 307/465 |
| 5,113,352 | 5/1992 | Finnerty | 364/490 |
| 5,134,586 | 7/1992 | Steele | 365/201 |
| 5,161,159 | 11/1992 | McClure et al. | 371/22.1 |

*Primary Examiner*—Thomas G. Black
*Assistant Examiner*—J. Harold Louis-Jacques
*Attorney, Agent, or Firm*—Skjerven, Morrill, MacPherson, Franklin and Friel

[57] ABSTRACT

An architecture is provided for testing and emulating an integrated circuit with embedded function blocks. The output nodes of the function blocks are connected through a tri-state buffer to a test bus which in turn is connected to configurable external pins. The external pins multiplex the normal I/O in normal mode and the test bus I/O in the test mode. The test bus is also connected through multiplexers to input nodes of function blocks. In test mode, the function block nodes are accessed through the test bus. For emulation of an embedded microcontroller or microprocessor, the internal connections of the microcontroller (or microprocessor) are brought out to those external pins which in normal operation are connected only to the microcontroller and not to any other function block. An in-circuit emulator (ICE) emulating the microcontroller is connected to the other function blocks through those external pins.

28 Claims, 17 Drawing Sheets

TESTING AND EMULATION OF INTEGRATED CIRCUITS

BACKGROUND OF THE INVENTION

1. Field of the Invention

The present invention relates to integrated circuits, and more particularly to testing and emulation of integrated circuits.

2. Description of Related Art

Advances in integrated circuit technology allow combining the components which were manufactured as separate integrated circuits into one integrated circuit. For example, a microprocessor, a gate array and a peripheral device typically manufactured as three separate (discrete) integrated circuits can now be embedded into one integrated circuit. Combining such components into one integrated circuit reduces the manufacturing costs and the size of the circuitry. The reliability is also improved as the problems associated with interconnecting discrete components on a printed circuit board are eliminated.

The testing of each component, however, is more complicated when the components are embedded into one integrated circuit because some internal connections of the components are not accessible from the external pins. The test vectors written for each individual component become unusable. Writing a new set of test vectors to test the circuit with the embedded components is expensive and time consuming.

Various techniques have been developed to access the internal connections of the components without adding a large number of external pins. In the "scan path" technique, the flip-flops of the integrated circuit are replaced by specially designed flip-flops each of which has a normal data input and a test data input. The flip-flops are interconnected into a shift register. The data can be shifted into each flip-flop through the test data inputs and shifted out through the flip-flop normal output. During testing, all the data are shifted in from one external pin into the flip-flops, the integrated circuit is clocked, and then the data are shifted out. The shifted-out data are analyzed so as to analyze the performance of the integrated circuit. This method, however, does not allow access to every internal connection of the embedded components.

In a "muxed I/O" technique illustrated in FIG. 1, every I/O node of every component is multiplexed, for testing purposes, to an external pin. The integrated circuit 110 of FIG. 1 has N function block 120.1 through 120.N each of which is an embedded component. The output node 130.1 of function block 120.1 is internally connected by line 140.1 to function block 120.N and, perhaps, to other function blocks. The line 140.1 is also connected to an N+1:1 multiplexer 150 which forms part of an I/O buffer 160.1 connected to the external pin 170.1. Multiplexer 150 multiplexes N test-mode connections from nodes 130.1, . . . , 130.N and a normal-mode connection 174 to pin 170.1. In normal mode, multiplexer 150 selects line 174. During testing, for example, of function block 120.1, multiplexer 150 selects the line 140.1.

Similarly, each input node 178.i of function block 120.i has an associated multiplexer 182.i. In normal mode, each multiplexer 182.i selects its normal-mode input IN connected to other function blocks in normal mode. In test mode, multiplexer 182.i selects its test input TIN connected to an external pin such as pin 170.2. The I/O buffer 160.2 of pin 170.2 contains a demultiplexer 186 which in test mode selects the line 188 connected to the inputs TIN of multiplexers 182.i. In normal mode, demultiplexer 186 selects the normal mode output 192.

In the integrated circuit 110 of FIG. 1, every I/O node of every function block 120.i is accessible from an external pin. However, the architecture of FIG. 1 reduces the speed of the circuit because the connections from the output nodes 130.i to the multiplexers such as multiplexer 150 present additional loading on the output nodes. Further, a large number of external pins are required to accommodate testing. In particular, one pin such as pin 170.1 is required for each output node of a given function block, though the same pin can be used for different output nodes of different function blocks. Similarly, one pin such as pin 170.2 is required for each input of a given function block. Thus the total number of the external pins required for testing is the maximum number of the output nodes in any one function block plus the maximum number of the input nodes. For example, if function block 120.1 has 40 output nodes and 10 input nodes and function block 120.N has 40 input nodes and 10 output nodes, the total number of pins required is eighty: 40 output pins and 40 input pins. It is desirable to reduce the number of the external pins required for testing and to reduce the loading of the test circuitry on the normal mode operation.

Embedding the components into one integrated circuit also complicates the emulation of the embedded devices such as microprocessors and microcontrollers. For example, FIG. 2 shows an integrated circuit 210 which includes microcontroller 120.1 and another function block 120.2. If blocks 120.1, 120.2 were discrete components, an in-circuit emulator (ICE) generally available for microcontroller 120.1 could be connected to function block 120.2 to replace the microcontroller. However, in integrated circuit 210, the internally connected nodes 220, 230 of function block 120.2 are not accessible to the emulator.

One approach to the problem is to create a separate emulator for the integrated circuit 210. Creating a separate emulator, however, is quite expensive.

Another approach is to emulate the integrated circuit 210 by discrete components so as to connect a stand-alone emulator of microcontroller 120.1 to a discrete component corresponding to function block 120.2. This approach, however, does not emulate the integrated circuit with sufficient precision because the timing and the layout in the discrete components is typically different from that in the combined integrated circuit.

A third approach is to create a "bond-out" device shown in FIG. 3. In the integrated circuit of FIG. 3, every internal connection is broken and brought out to an additional external pin. The internal nodes 220, 230 of function block 120.2 become accessible to the emulator. Further, every function block is accessible for testing. However, the layout of the bond-out device is typically different from the layout of the integrated circuit 210 of FIG. 2. Hence the emulation precision is sacrificed.

Thus there is a need for an emulation technique which provides high precision emulation and which permits using an ICE for a stand-alone microcontroller so as not to require an ICE for an entire integrated circuit.

SUMMARY OF THE INVENTION

The present invention provides a test architecture and an emulation architecture for integrated circuits. The test architecture of the invention reduces the loading on the normal-mode connections and hence increases the speed of the normal-mode operation. These advantages are achieved as follows in some embodiments. The function block nodes are connected to a test bus through tri-state buffers. The test bus lines are connected to external pins. The tri-state buffers are located close to the respective nodes. In normal mode, the tri-state buffers are disabled. Hence the test bus line extending from near the node to an external pin does not load the node in normal mode. Since the loading on the node is reduced, the speed is increased.

The test bus architecture also allows in some embodiments to reduce the number of pins required for testing. In some embodiments, the test bus lines are bidirectional. The external pins connected to the test bus lines are configurable so as to allow bidirectional I/O in test mode. A bidirectional test bus line can be connected to the node of any type: input, output or bidirectional. Thus, the same test bus line can be connected, for example, to an input node of one function block and to an output node of another function block. The number of test bus lines required for testing is therefore reduced, and hence the number of external pins needed for interface to the test bus is also reduced.

The emulation architecture for integrated circuits with embedded programmable devices such as software-programmable microprocessors and microcontrollers permits emulation by an emulator created for a stand-alone (discrete) microprocessor or microcontroller without replacing the other function blocks of the integrated circuit by discrete components. During emulation, the other function blocks of the integrated circuit function normally. The same integrated circuit is used for emulation and for normal-mode operation, so that high precision in emulation is achieved.

This functionality is achieved in some embodiments by multiplexing the internal connections to the microcontroller (or microprocessor) so as to bring out those connections to external pins. In some embodiments those external pins are used which in normal mode are connected only to the microcontroller and not to any other function block. In emulation mode, the microcontroller is disabled, and hence these external pins are not needed to access the microcontroller. They are used instead to connect internal connections to the emulator.

Other features of the invention are described below. The invention is defined by the appended claims.

DESCRIPTION OF THE PREFERRED EMBODIMENTS

Figure 4:
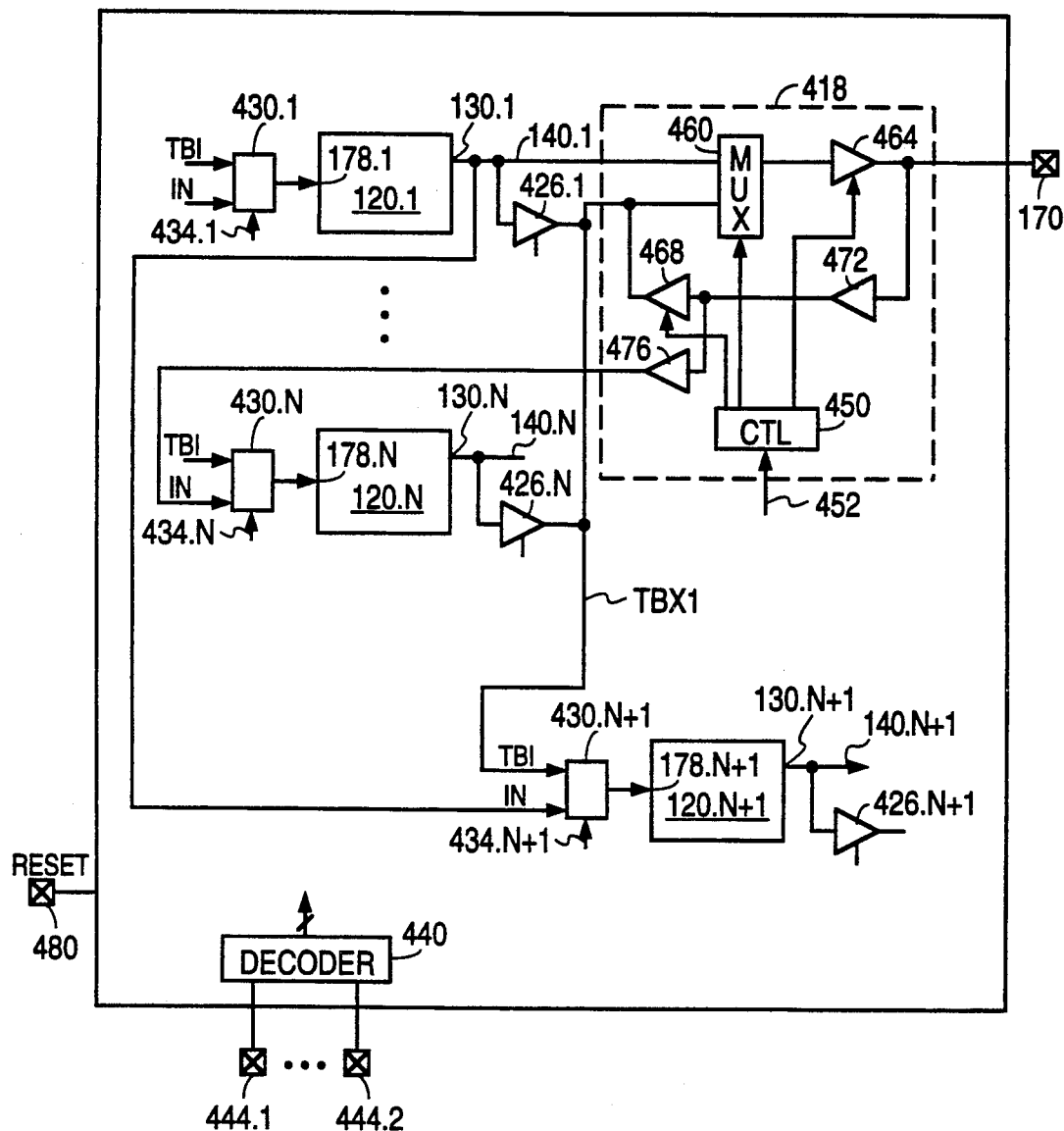
FIG. 4 is a block diagram of an integrated circuit with a test bus according to the present invention.

FIG. 4 illustrates an integrated circuit 410 in which the function blocks 120.1, 120.2 ... 120.N, 120.N+1 .. . are testable by means of a test bus. Each function block 120.i has an output node 130.i and an input node 178.i. In normal (non-test) mode, each node 130.i, 178.i is connected to other nodes or to external pins or both. For example, output node 130.1 of function block 120.1 is connected through I/O buffer 418 to external pin 170 and, through multiplexer 430.N+1, to input node 178.N+1.

Integrated circuit 410 includes a test bus of which only one line TBX1 is shown in FIG. 4. Each test bus line is connected to at most one node of each function block. Test bus line TBX1 is connected to output nodes 130.1, ... 130.N through respective tri-state buffers 426.1, ... 426.N. Test bus line TBX1 is connected to input node 178.N+1 through multiplexer 430.N+1. Each input node 178.i is connected to the output of multiplexer 430.i which selects a normal node input IN or a test bus input TBI. Each test bus input TBI is connected to a test bus line. In normal mode, each multiplexer 430.i selects its normal-mode input IN. In test mode, each multiplexer 430.i selects its test bus input TBI. The select signals on one or more select lines 434.i of each multiplexer 430.i are derived from the output signals of decoder 440 whose inputs are connected to external pins 444.1, ..., 444.2.

Each output node 130.i is connected to the test bus through tri-state buffer 426.i. Output nodes 130.1, ..., 130.N are connected through such buffers to test bus line TBX1. Output node 130.N+1 is connected through buffer 426.N+1 to another test bus line (not shown). The enable inputs of buffers 426.i receive signals derived from decoder 440.

The signals on output nodes 130.i are provided on lines 140.i for normal-mode connections.

Each test bus line is connected to an external pin through an I/O buffer. Test bus line TBX1 is connected to external pin 170 through I/O buffer 418. Buffer 418 is controlled by control circuit 450. The signals on input lines 452 of control circuit 450 are derived from decoder 440.

When the signals on the external pins 444.1, ..., 444.2 indicate a normal mode of operation, decoder 440 disables tri-state buffers 426.i, and decoder 440 causes multiplexers 430.i to select their normal mode inputs IN. Control circuit 450 configures the external pin 170 as a bidirectional pin for normal mode operation. Namely, multiplexer 460 selects line 140.1. Tri-state buffer 464 is enabled. Thus, the output signals on line 140.1 are passed to pin 170. Tri-state buffer 468 is disabled isolating the pin 170 from the test bus line TBX1. Input signals from pin 170 pass through buffers 472 and 476 to input IN of multiplexer 430.N and then to input node 178.N.

The test mode will be illustrated on the example of testing the function block 120.N. When the signals on external pins 444.1, ..., 444.2 indicate a test of function block 120.N, decoder 440 enables buffer 426.N while keeping all the other buffers 426.i disabled. Multiplexer 430.N selects test bus input TBI. Thus test bus line TBX1 is connected to output node 130.N and another test bus line (not shown) which is connected to input TBI of multiplexer 430.N, becomes connected to input node 178.N. External pin 170 is reconfigured as an output pin to provide the signals from test bus line TBX1. Namely, multiplexer 460 selects test bus line TBX1. Tri-state buffer 464 is enabled, and buffer 468 is disabled.

The test bus line (not shown) connected to the input line TBI of multiplexer 430.N becomes similarly connected to another external pin (not shown) which is configured as an input pin. That external pin provides input signals to function block 120.N in test mode, while external pin 170 provides the output signals.

During testing of function block 120.N+1, external pin 170 is configured as an input pin connected to test bus line TBX1. Namely, buffer 464 is disabled, and buffer 468 is enabled. Multiplexer 430.N+1 selects input TBI. Buffer 426.N+1 is enabled connecting output node 130.N+1 to a test bus line (not shown) which is connected to an external pin configured as an output pin.

The other test blocks are tested similarly.

During leakage current testing, buffer 464 is disabled to tri-state pin 170 while the leakage current on pin 170 is tested.

Because each test bus line is bidirectional, the maximum number of test bus lines required for testing equals the maximum number of input/output nodes in a function block. For example, if each function block 120.1 through 120.N has 40 output nodes and 10 input nodes, and function block 120.N+1 has 40 input nodes and 10 output nodes, the maximum number of external pins required for testing is 50 since each block has 50 input-/output nodes. The number of external pins is reduced compared to some prior art techniques where 80 pins are required—40 pins for 40 output nodes and 40 pins for 40 input nodes.

Decoder pins 444.1, ..., 444.2 are additional pins required for testing which are not included in the above pin number computations. However, in some embodiments, the decoder pins 444.i are multiplexed with other pins. The function of pins 444.1, ..., 444.2 is determined during reset. When RESET signal is asserted on pin 480, the signals on one or more predetermined pins are sampled. If these signals are a predetermined value, the test mode is recognized, and pins 444.1, ..., 444.2 are configured for decoder input. Otherwise pins 444.1, ... 444.2 are configured for the normal-mode operation.

Decoder 440, buffers 418 and 426.i, and multiplexers 430.i are constructed using methods well known in the art. Configuration of pins 441.1, ..., 444.2 on Reset is also performed using methods well known in the art.

Figure 5:
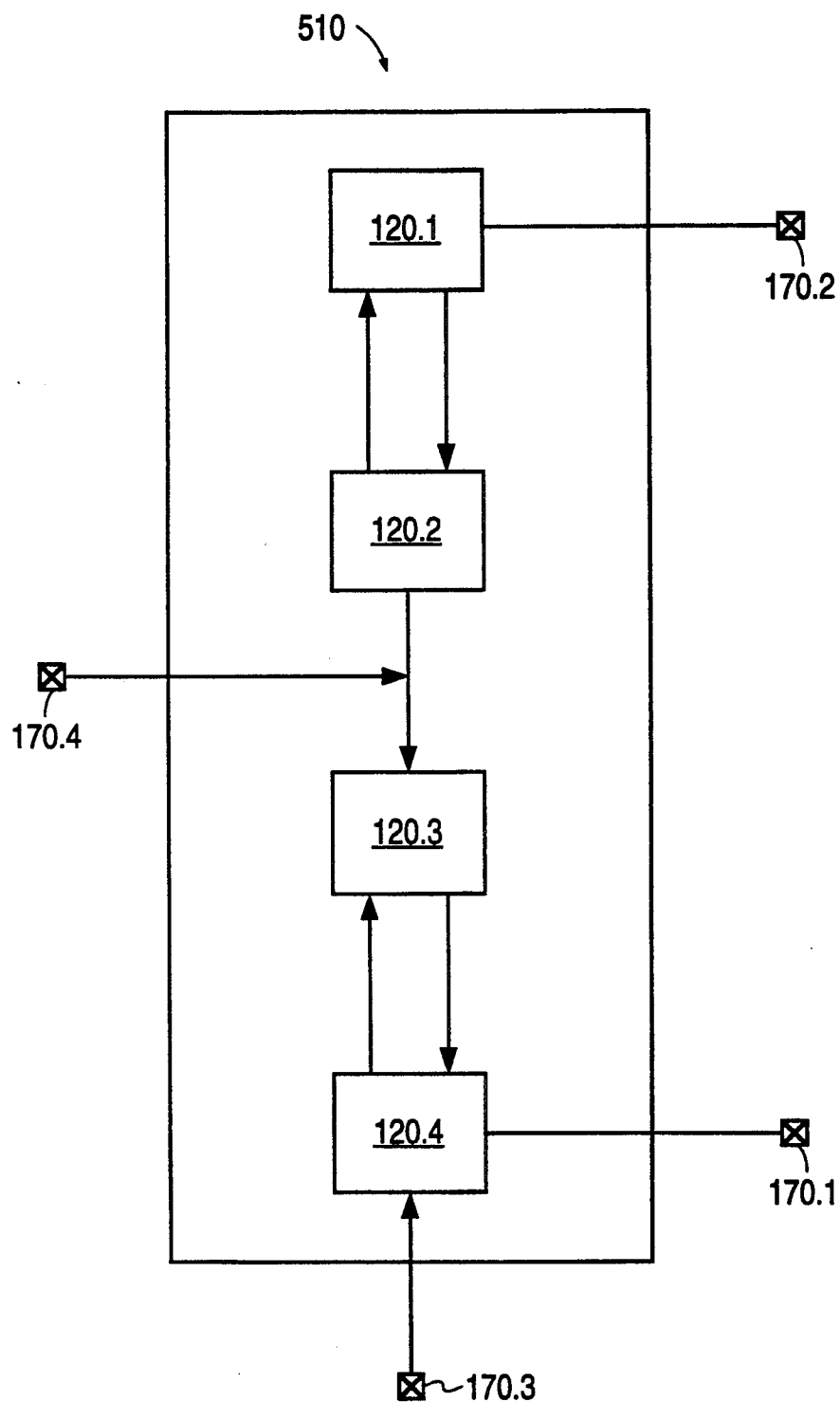
FIG. 5 is a block diagram of an integrated circuit.
Figure 6:
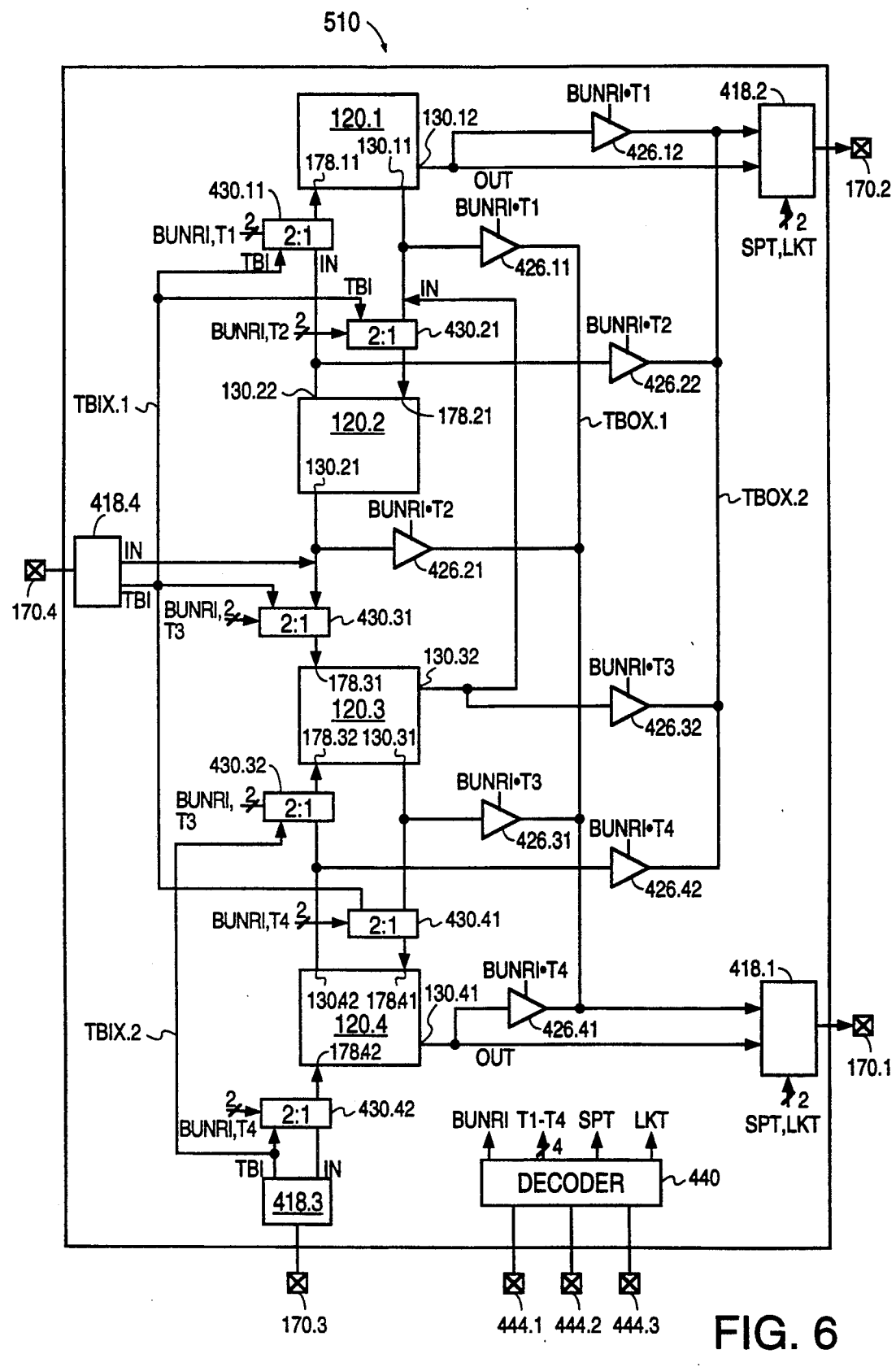
FIG. 6 is a block diagram of the circuit of FIG. 5 but with a test bus according to the present invention.

Another embodiment of an integrated circuit with a test bus is illustrated on the example of FIGS. 5 and 6. Integrated circuit 510 of FIG. 5 does not have a test bus. A similar circuit in FIG. 6 includes a test bus. Test bus lines TBOX.1, TBOX.2 are unidirectional output lines connected, respectively, to output pins 170.1 and 170.2 through respective I/O buffers 418.1, 418.2. Buffers 418.i are controlled by signals SPT, LKT produced by decoder 440 from signals on the external pins 444.1, 444.2, 444.3.

Similarly, test bus lines TBIX.1 and TBIX.2 are unidirectional input lines connected, respectively, to input pins 170.4 and 170.3 through respective I/O buffers 418.4, 418.3.

Each output node 130.ij of function block 120.i is connected to test bus line TBOX.j through tri-state buffer 426.ij. For example, output node 130.12 of function block 120.1 is connected to test bus line TBOX.2 through buffer 426.12. The enable input of each buffer 426.ij is controlled by the AND of the signals BUNRI and Ti which signals are produced by decoder 440. For example, the enable input of buffer 426.12 receives the signal BUNRI AND T1.

The truth table for the signals produced by decoder 40 is as follows.

TABLE 1

| Mode | BUNRI | T1 | T2 | T3 | T4 | SPT | LKT |
|---|---|---|---|---|---|---|---|
| Normal | 0 | X | X | X | X | 0 | 0 |
| Test 120.1 | 1 | 1 | 0 | 0 | 0 | 1 | 0 |
| Test 120.2 | 1 | 0 | 1 | 0 | 0 | 1 | 0 |
| Test 120.3 | 1 | 0 | 0 | 1 | 0 | 1 | 0 |
| Test 120.4 | 1 | 0 | 0 | 0 | 1 | 1 | 0 |
| Test leakage current, or "dead mode" | 1 | 0 | 0 | 0 | 0 | 1 | 1 |

The "Mode" of Table 1 is determined by the signals on pins 444.1, 444.2 and 444.3. In normal mode, BUNRI is 0, and all the buffers 426.ij are disabled. The test bus lines TBOX.i are tri-stated. SPT=LKT=0, causing I/O buffers 418.i to connect the respective external pins 170.i to normal-mode lines.

In test mode, BUNRI is 1. When a function block is tested, SPT=1, LKT=0, causing the I/O buffers 418.i to connect the respective external pins 170.i to the respective test bus lines. The signal Ti corresponding to function block being tested is 1, and the remaining signals Ti are 0. For example, when block 120.1 is tested, T1=1 and T2 through T4 are 0. Hence the buffers 426.ij corresponding to the function block being tested are enabled, and the remaining buffers 426.ij are disabled. The output signals from the function block being tested are provided to the external pins 170.1, 170.2 through the test bus lines TBOX.1, TBOX.2. The multiplexers 430.ij of the function block being tested select their test bus inputs TBI. Input signals from pins 170.4, 170.3 are provided through test bus lines TBIX.1, TBIX.2 to the function block being tested.

When the leakage current is tested, BUNRI=1, and T1 through T4 are 0. SPT=LKT=1, which causes the I/O buffers 418.1, 418.2 to tri-state the respective external pins 170.1 and 170.2. The leakage currents on pins 170.1, 170.2 can then be measured.

The "test leakage current" mode is used also as a "dead mode" to disable the integrated circuit 510 of FIG. 6 in a printed circuit board (not shown) without desoldering the integrated circuit. Integrated circuit 510 is put in dead mode in order to isolate it from the other integrated circuits on the printed circuit board during the testing of the other circuits. The dead mode is also used for emulation as described below. Since the need to desolder the circuit 510 is eliminated, testing and emulation are facilitated.

In some embodiments, output node 130.12 is not connected to test bus line TBOX.2. Buffer 426.12 is not present. When function block 120.1 is tested, I/O buffer 418.2 selects the normal-mode connection so as to connect output node 130.12 to external pin 170.2. When other function blocks 120.i are tested, I/O buffer 418.2 connects test bus line TBOX.2 to pin 170.2. To provide such a control of I/O buffer 418.2, decoder 440 generates an additional signal SPT1 (not shown) which is provided to I/O buffer 418.2 instead of signal SPT.

Similarly, in some embodiments, output node 130.41 of function block 120.4 is not connected to test bus line TBOX.1.

Figure 7:
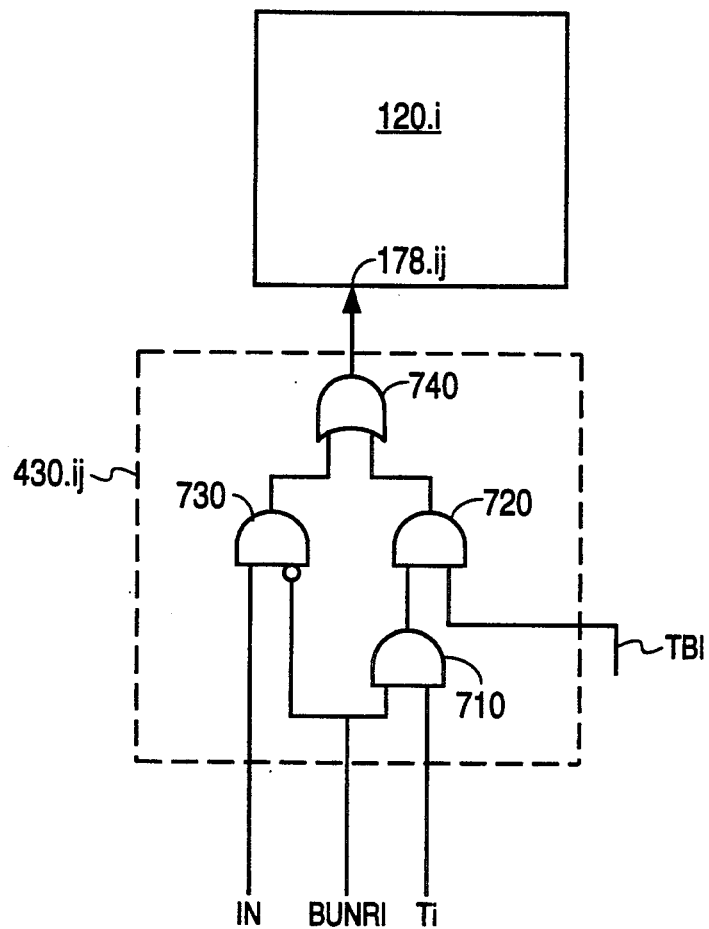
FIGS. 7-20 are block diagrams of portions of integrated circuits which diagrams illustrate the present invention.

Each input node 178.ij of each function block 120.i is connected to test bus line TBIX.j through multiplexer 430.ij whose circuit diagram appears in FIG. 7. In normal mode, BUNRI=0 so as to disable the AND gates 710 and 720 and enable the AND gate 730. Gate 730 and the OR gate 740 pass the normal mode input IN to input node 178.ij.

During testing of block 120.i, BUNRI=Ti=1 to enable AND gate 720. Gate 730 is disabled. Input 178.ij becomes connected to test input TBI through gates 720 and 740.

Figure 8:
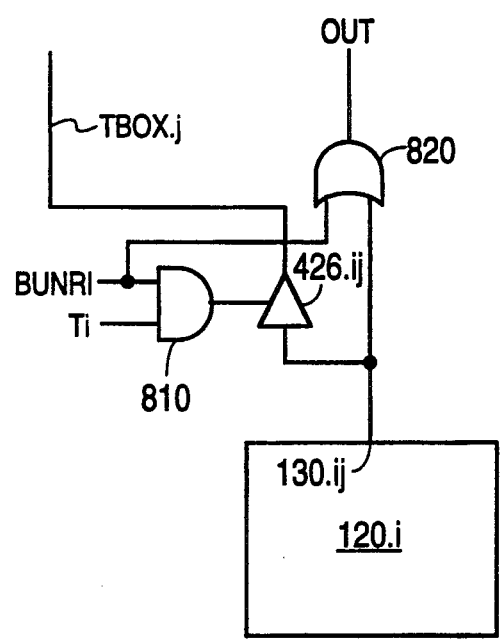

FIG. 8 illustrates an alternate scheme for providing signals from output node 130.ij. Node 130.ij is connected to test bus line TBOX.j through a tri-state buffer 426.ij as in FIG. 6. Buffer 426.ij is controlled by signals BUNRI and Ti ANDed by AND gate 810, similarly to the scheme of FIG. 6. To provide the normal-mode output OUT, the signals on node 430.ij are ORed with BUNRI by OR gate 820. Hence in test mode, the normal output OUT=1 providing a known valid state.

Decoder 440 is constructed using techniques well known in the art.

In some embodiments, test bus lines TBIX.i, TBOX.i are bidirectional lines as in FIG. 4. The I/O buffers 418.i are bidirectional configurable buffers as in FIG. 4.

Figure 9:
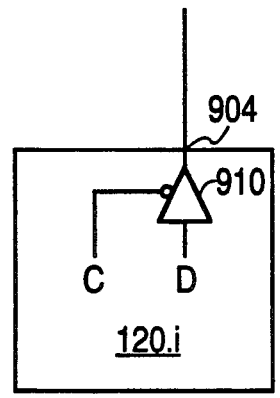
Figure 10:
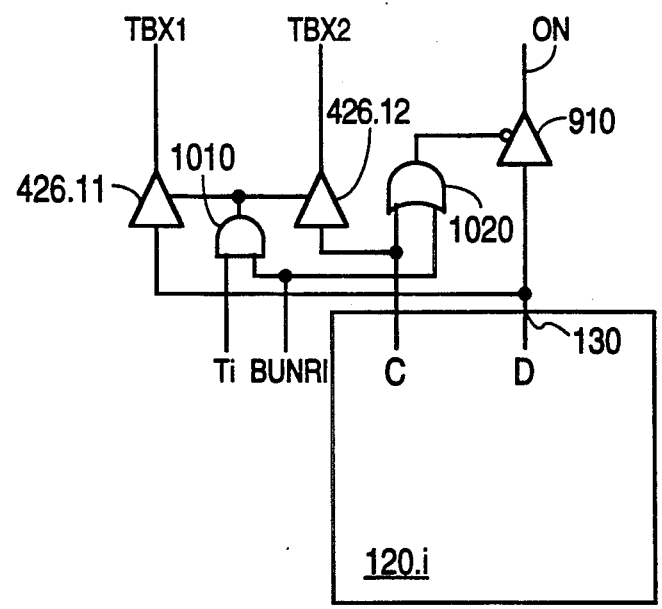

FIGS. 9 and 10 illustrate how a tri-state output node is interfaced to a test bus in one embodiment. FIG. 9 illustrates a conventional tri-state output node 904 in a circuit without a test bus. When control signal C is 0, buffer 910 is enabled providing data signals D to output node 904. When control signal C is 1, buffer 910 is disabled.

FIG. 10 illustrates the circuit of FIG. 9 with test bus lines TBX1, TBX2 which in test mode provide, respectively, the signals D and C. Each of lines TBX1, TBX2 is a unidirectional output line or a bidirectional line. Node 130 on which the data signals D are provided is connected to test bus line TBX1 through tri-state buffer 426.11. Signals C are provided on line TBX2 through tri-state buffer 426.12. The enable inputs of buffers 426.11 and 426.12 receive BUNRI AND Ti from AND gate 1010. Control signals C are ORed with BUNRI by the OR gate 1020 so as to disable the buffer 910 in test mode.

In some embodiments, the OR gate 1020 is omitted, and the control input C is connected directly to the enable input of buffer 910 as in FIG. 9.

The test bus interface is similar for the tri-state outputs 904 that are enabled when C=1 and disabled when C=0.

Figure 11:
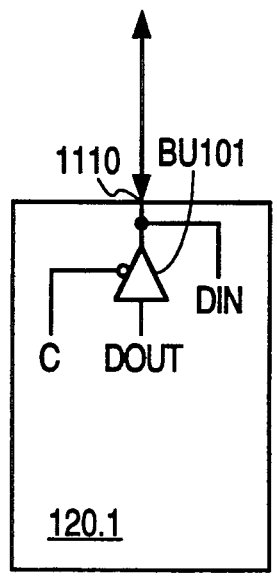
Figure 12:
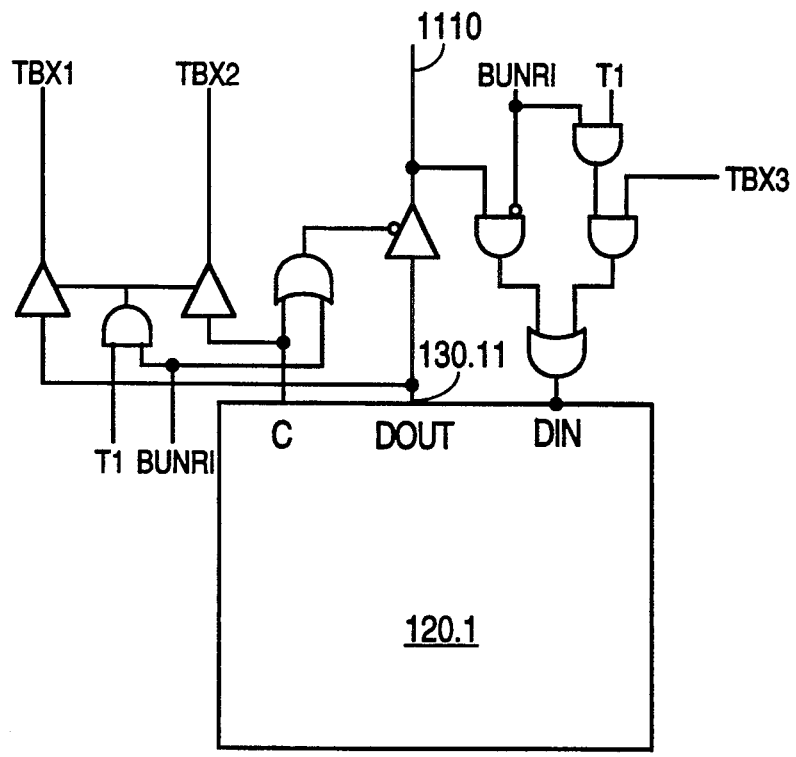

FIGS. 11 and 12 illustrate how a bidirectional node 1110 is interfaced to a test bus in one embodiment. In FIG. 11, no test bus is present. In FIG. 12, control output C, data output DOUT and data input DIN are connected to, respectively, test bus lines TBX2, TBX1, TBX3. Data output DOUT and control signal C are connected, respectively, to test bus lines TBX1, TBX2 through the same logic as in FIG. 10. Data input DIN is connected to test bus line TBX3 through the same logic as in FIG. 7. Each of lines TBX1, TBX2 is a bidirectional line or an output line. Test bus line TBX3 is a bidirectional line or an input line.

Figure 13:
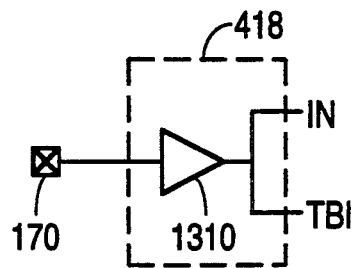

FIG. 13 illustrates one embodiment of input buffer 418 such as buffers 418.3, 418.4 in FIG. 6. External pin 170 is connected to the input of buffer 1310 whose output is connected to the normal-mode input IN and the test mode input TBI.

Figure 14:
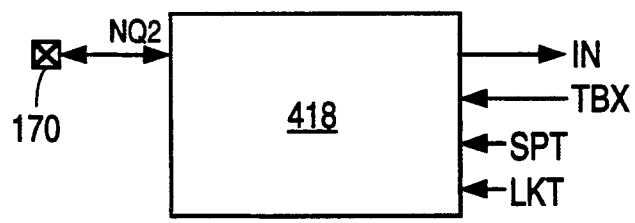

FIG. 14 illustrates a block diagram of an I/O buffer 418 which is configured as an input buffer in normal mode and as an output buffer in test mode. The buffer is configured by signals SPT, LKT as shown in the truth tables in Tables 2 and 3 below. Table 2 shows the truth table when the buffer 418 is configured as an input buffer. Table 3 shows the truth table when the buffer is configured as an output buffer.

TABLE 2

| Mode | (input) | | | | |
|---|---|---|---|---|---|
| | NQ2 | SPT | LKT | TBX | IN |
| Normal | 0 | 0 | 0 | A | 0 |
| | 1 | 0 | 0 | A | 1 |

TABLE 3

| Mode | (output) | | | | |
|---|---|---|---|---|---|
| | SPT | LKT | TBX | IN | NQ2 |
| Test | 1 | 0 | 1 | 1 | 1 |
| | 1 | 0 | 0 | 0 | 0 |
| | 1 | 1 | A | X | Z |

In normal mode, SPT=LKT=0. Whatever the value of the test bus connection TBX ("A" means "any" in the truth tables herein) the value of the input IN, which input is the output of buffer 418 of FIG. 14, is the value of the signal NQ2 on pin 170.

In test mode (SPT=1), buffer 418 is an output buffer. During a function block test (LKT=0), output signal NQ2 tracks the test bus line signal TBX. The input IN is generally "don't care" and in the embodiment of FIG. 14, IN=TBX.

During leakage current test (LKT=1), the output NQ2 is at high impedance (Z), input IN is don't care ("X").

Buffer 418 of FIG. 14 is constructed from the truth tables of Tables 2 and 3 using techniques well known in the art.

Figure 15:
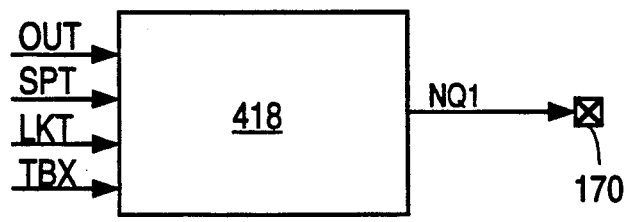

FIG. 15 illustrates a block diagram of an I/O buffer 418 such as buffer 418.1 of FIG. 6, which buffer is an output buffer in both normal mode and test mode. The truth table for the buffer is given in Table 4 below. In normal mode, the signal on output NQ1 connected to external pin 170 tracks the value of normal-mode output OUT. In test mode when a function block is being tested (SPT=1, LKT=0), the output NQ1=TBX. During leakage current test, NQ1 is high impedance.

TABLE 4

| Mode | OUT | SPT | LKT | TBX | NQ1 |
|---|---|---|---|---|---|
| Normal | 0 | 0 | 0 | A | 0 |
| | 1 | 0 | 0 | A | 1 |
| Test | A | 1 | 0 | 0 | 0 |
| | A | 1 | 0 | 1 | 1 |
| | A | 1 | 1 | A | Z |

Figure 16:
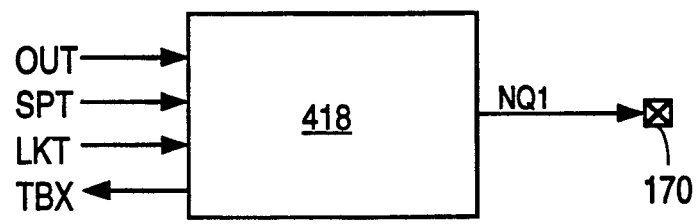

FIG. 16 illustrates a block diagram of an I/O buffer 418 which is configured as an output buffer in normal mode and as an input buffer in a function block test mode. The truth table for the case when the buffer is an output buffer is illustrated in Table 5 below. In normal mode, output NQ1=OUT. During leakage current testing, NQ1 is high impedance.

The trush table for the case when the buffer is configured as an input buffer is shown in Table 6 below. In that case, test bus output TBX=NQ1.

TABLE 5

| Mode | OUT | SPT | LKT | NQ1 | TBX |
|---|---|---|---|---|---|
|  |  |  | (output) |  |  |
| Normal | 0 | 0 | 0 | 0 | 0 |
|  | 1 | 0 | 0 | 1 | 1 |
| Test | A | 1 | 1 | Z | X |

TABLE 6

| Mode | NQ1 | OUT | SPT | LKT | TBX |
|---|---|---|---|---|---|
|  |  | (input) |  |  |  |
| Test | 0 | A | 1 | 0 | 0 |
|  | 1 | A | 1 | 0 | 1 |

Figure 17:
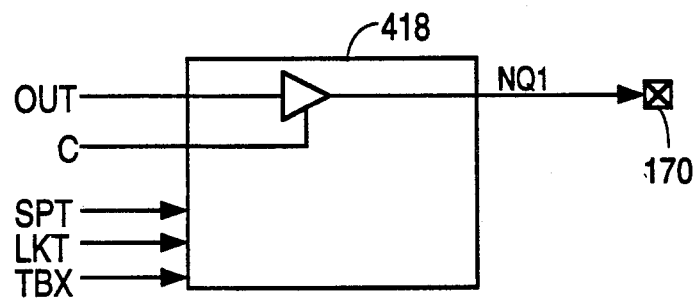

FIG. 17 illustrated a block diagram of a tri-state output buffer 418 which is configured as an output buffer in test mode. In normal mode (SPT=LKT=0), test bus input TBX of buffer 418 is ignored. In a function block test mode (SPT=1, LKT=0), the normal mode data output OUT and the control signal C are ignored, and NQ1=TBX. During leakage current testing (SPT=LKT=1), output NQ1 is high impedance whatever the value of OUT, C and TBX.

Figure 18:
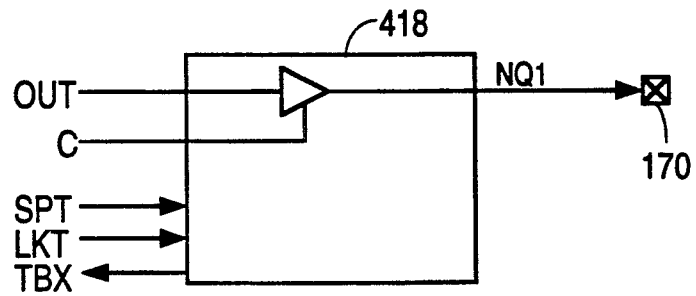

FIG. 18 illustrates a block diagram of an I/O buffer 418 configured as tri-state output buffer in normal mode and as an input buffer in function block test mode. Table 7 below illustrates the truth table when the buffer is configured as an output buffer. Table 8 below illustrates the truth table when the buffer is configured as an input buffer. In normal mode, output NQ1 is either OUT or high impedance depending on the value of control signal C. During leakage current testing, NQ1 is high impedance. During function block testing, test bus output TBX of buffer 418 has the value of NQ1.

TABLE 7

| Mode | OUT | C | SPT | LKT | NQ1 | TBX |
|---|---|---|---|---|---|---|
|  |  |  | (output) |  |  |  |
| Normal | 0 | 1 | 0 | 0 | 0 | 1 |
|  | 1 | 1 | 0 | 0 | 1 | 1 |
|  | A | 0 | 0 | 0 | Z | 1 |
| Test | A | A | 1 | 1 | Z | X |

TABLE 8

| Mode | NQ1 | OUT | C | SPT | LKT | TBX |
|---|---|---|---|---|---|---|
| Test | 0 | A | A | 1 | 0 | 0 |
|  | 1 | A | A | 1 | 0 | 1 |

Figure 19:
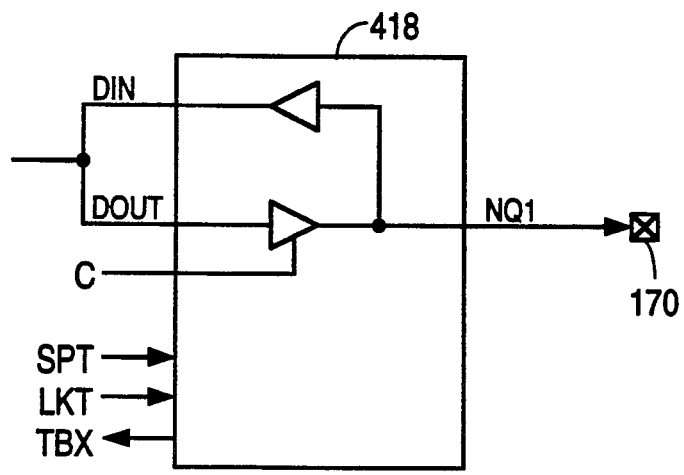

FIG. 19 illustrates a block diagram of an I/O buffer 418 which is configured as a bidirectional buffer in normal mode and as an input buffer in function block test mode. The truth table when the buffer provides output signals is given in Table 9 below. The truth below when the buffer provides input signals is given in Table 10 below. In the tables, "DOUT" is the normal-mode output and "DIN" is the normal-mode input. "C" is the normal mode tri-state enable signal.

TABLE 9

| Mode | DOUT | C | SPT | LKT | NQ1 | DIN | TBX |
|---|---|---|---|---|---|---|---|
|  |  |  | (output) |  |  |  |  |
| Normal | 0 | 1 | 0 | 0 | 0 | 0 | 0 |
|  | 1 | 1 | 0 | 0 | 1 | 1 | 1 |
|  | A | 0 | 0 | 0 | Z | X | X |

TABLE 9-continued

| Mode | DOUT | C | SPT | LKT | NQ1 | DIN | TBX |
|---|---|---|---|---|---|---|---|
|  |  |  | (output) |  |  |  |  |
| Test | A | A | 1 | 1 | Z | X | X |

TABLE 10

| Mode | NQ1 | DOUT | C | SPT | LKT | DIN | TBX |
|---|---|---|---|---|---|---|---|
|  |  |  | (input) |  |  |  |  |
| Normal | 0 | A | 0 | 0 | 0 | 0 | 0 |
|  | 1 | A | 0 | 0 | 0 | 1 | 1 |
| Test | 0 | A | A | 1 | 0 | 0 | 0 |
|  | 1 | A | A | 1 | 0 | 1 | 1 |

Figure 20:
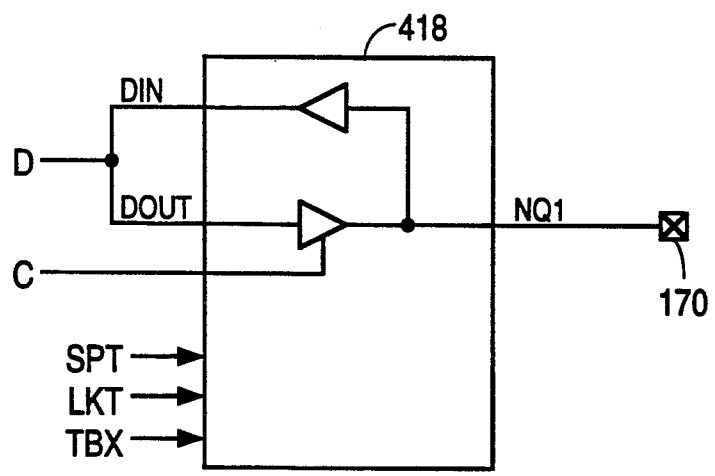

FIG. 20 illustrates a block diagram of an I/O buffer 418 which is configured as a bidirectional buffer in normal mode and as an output buffer in test mode. The truth table for the buffer 418 when the pin 170 provides output signals is illustrated in Table 11 below. The truth table when the buffer is configured as a bidirectional buffer and pin 170 receives input signals is illustrated in Table 12 below.

TABLE 11

| Mode | DOUT | C | SPT | LKT | TBX | NQ1 | DIN |
|---|---|---|---|---|---|---|---|
| Normal | 0 | 1 | 0 | 0 | A | 0 | 0 |
|  | 1 | 1 | 0 | 0 | A | 1 | 1 |
|  | A | 0 | 0 | 0 | A | Z | X |
| Test | A | A | 1 | 1 | A | Z | X |
|  | A | A | 1 | 0 | 0 | 0 | 0 |
|  | A | A | 1 | 0 | 1 | 1 | 1 |

TABLE 12

| Mode | NQ1 | DOUT | C | SPT | LKT | TBX | DIN |
|---|---|---|---|---|---|---|---|
| Normal | 0 | A | 0 | 0 | 0 | A | 0 |
|  | 1 | A | 0 | 0 | 0 | A | 1 |

The I/O buffers 418 of FIGS. 6 and 13-20 are constructed using techniques well known in the art.

In addition to separately testing each function block, one can also test the interconnections between the function blocks in the integrated circuit of FIG. 6. One technique for testing the interconnections is to place the integrated circuit in normal mode and to supply test vectors through pins 170.i.

Another technique is to have one of the function blocks execute a test program. For example, in one embodiment, function block 120.4 is a microcontroller whose address bus has data bus are connected to external pins. In one interconnection testing technique, integrated circuit 510 is plugged into an automatic tester (not shown) which uses the address/data bus of microcontroller 120.4 to cause the microcontroller to execute a program in the tester's memory, for example, read only memory (ROM). The program causes the microcontroller to write and read from other function blocks 120.i so as to exercise the interconnections between the function blocks and to test the interconnections.

Figure 21:
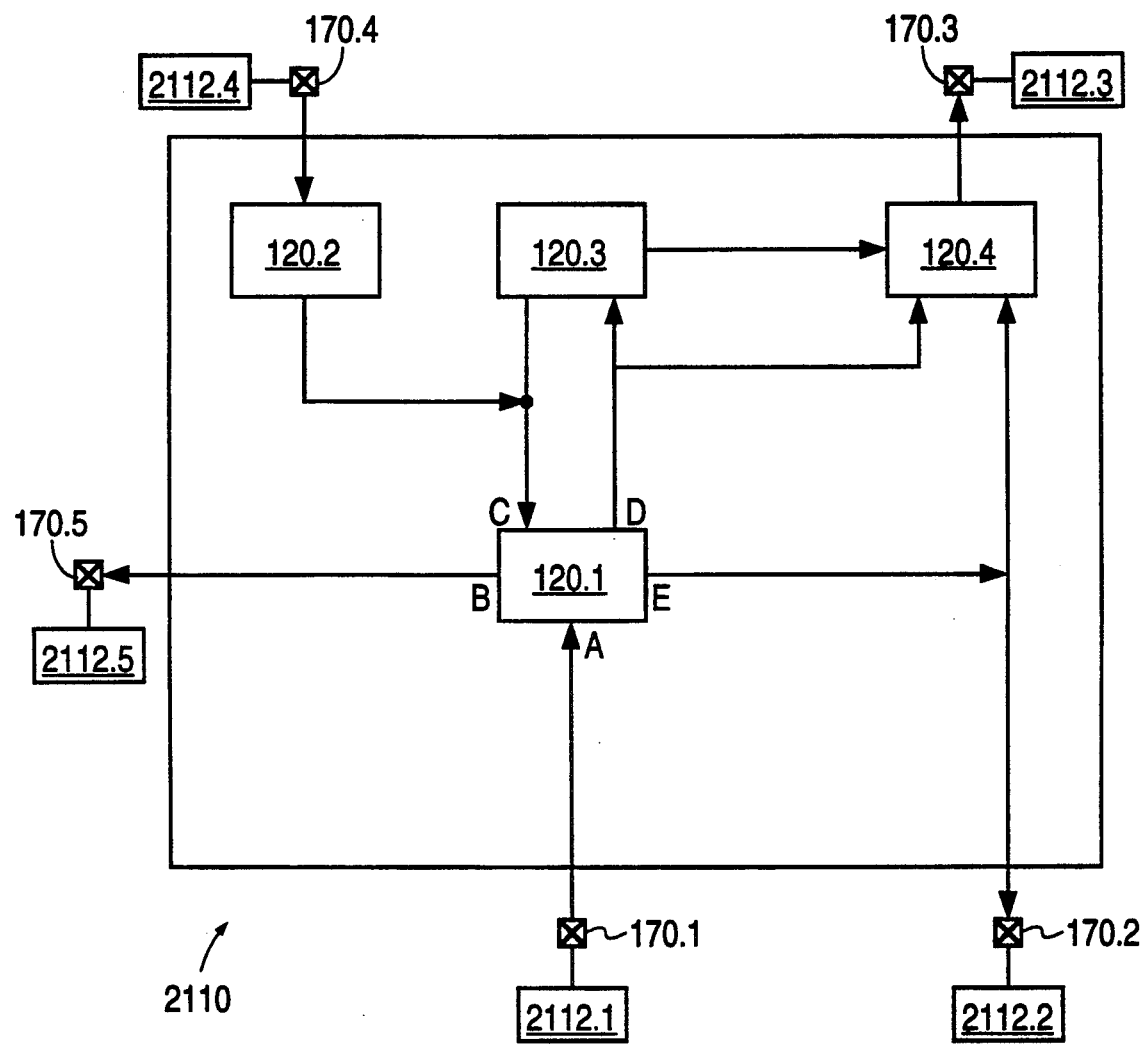
FIGS. 21 and 22 are block diagrams of integrated circuits which diagrams illustrate the present invention.
Figure 22:
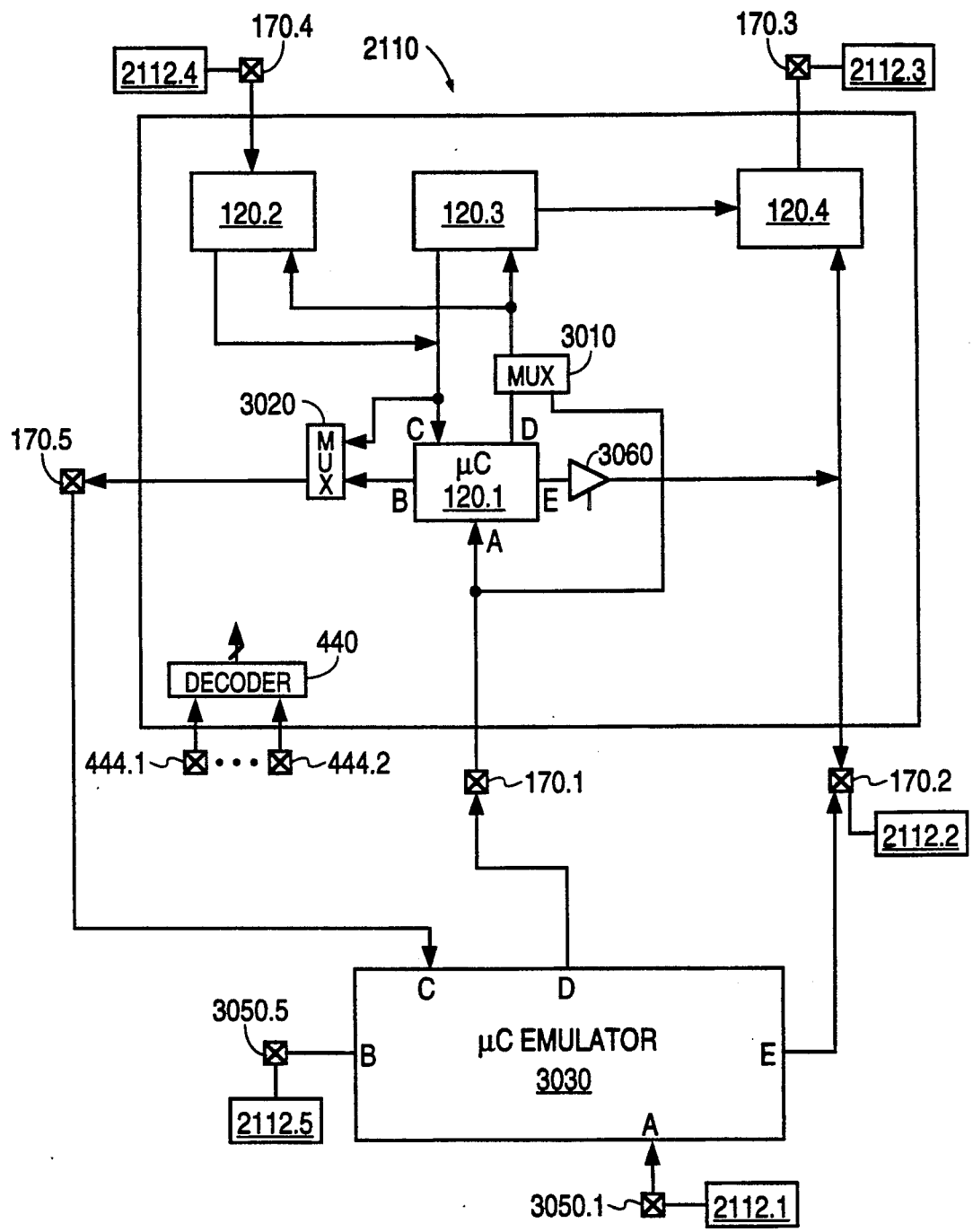

FIGS. 21, 22 illustrate an emulation technique for an embedded programmable function block such as a microprocessor or a microcontroller. FIG. 21 illustrates an integrated circuit 2110 in which function block 120.1 is a software-programmable microcontroller. Function blocks 120.2, 120.3 and 120.4 can be any function blocks, including microcontrollers. Microcontroller 120.1 has an input node A connected to external pin 170.1, an output node B connected to external pin 170.5, an input node C connected to outputs of function blocks 120.2, 120.3, an output node D connected to inputs of function blocks 120.3, 120.4, and an output node E connected to a bidirectional node of function block 120.4 and also connected to external pin 170.2. Each pin 170.i is connected to a device 2112.i which can be another integrated circuit or any other kind of device.

FIG. 22 shows a similar integrated circuit 2110 but with emulation circuitry which includes multiplexers 3010, 3020 and decoder 440. When microcontroller 120.1 is emulated, the microcontroller is disabled and replaced by emulator 3030, while function blocks 120.2, 120.3 and 120.4 are connected to the emulator and are enabled to function normally. Devices 2112.i connected to integrated circuit 2110 through external pins 170.1 through 170.5 also continue to operate normally.

In emulation mode, the internal connections to microprocessor 120.1 are brought out to external pins 170.i. Thus the connections to input node C are brought out to pin 170.5 through multiplexer 3020. Multiplexer 3020 is controlled by decoder 440 which in turn is controlled by the signals on pins 444.1, . . . 444.2.

When the signals on pins 444.1, . . . 444.2 indicate normal mode, multiplexer 3020 connects node B of microprocessor 120.1 to pin 170.5 establishing a connection as in FIG. 21. When the signals on pins 444.1, . . . 444.2 indicate emulation mode, multiplexer 3020 connects node C of microprocessor 120.1 to pin 170.5. Pin 170.5 is connected during emulation to node C of emulator 3030. Nodes A through E of emulator 3030 emulate the respective nodes A through E of microcontroller 120.1. Thus the signals on node C of microcontroller 120.1 are routed to node C of emulator 3030. Output signals on node B of microcontroller 120.1 are blocked by multiplexer 3020. Node B of emulator 3030 is connected to a pin 3050.5 which is connected to device 2112.5.

Similarly, multiplexer 3010 controlled by decoder 440 selects in normal mode the node D of microcontroller 120.1, and multiplexer 3010 selects in emulation mode the node D of emulator 3030 which is connected to the multiplexer through pin 170.1. Pin 170.1 continues to be connected to input node A of microcontroller 120.1. However, since the output signals from microcontroller 120.1 are disabled, its input signals are "don't care". Input node A of emulator 3030 is connected to a pin 3050.1 which is connected to device 2112.1.

Output signals on node E of microcontroller 120.1 are blocked in emulation mode by tri-state buffer 3060 controlled by decoder 440. In normal mode, buffer 3060 is enabled to pass through the signals on node E of the microcontroller. In emulation mode, pin 170.2 is connected to node E of emulator 3030. In both the normal and the emulation modes, pin 170.2 is connected to device 2112.2.

The connections to pins 170.3, 170.4 are the same in the normal and emulation modes.

In general, every internal connection from function blocks 120.2, 120.3, 120.4 to microcontroller 120.1, which connection is not connected to any external pin in normal mode, is brought out in emulation mode through an external pin to emulator 3030. The external pins used to bring out such internal connections can be taken from the pins which in normal mode are not connected to any function block except microcontroller 120.1, such as pins 170.5, 170.1 in FIG. 22. If such pins are insufficient, additional pins are used. The output signals from microcontroller 120.1 are blocked by a multiplexer such as multiplexers 3020, 3010, or a tri-state buffer such as buffer 3060.

Figure 22A:
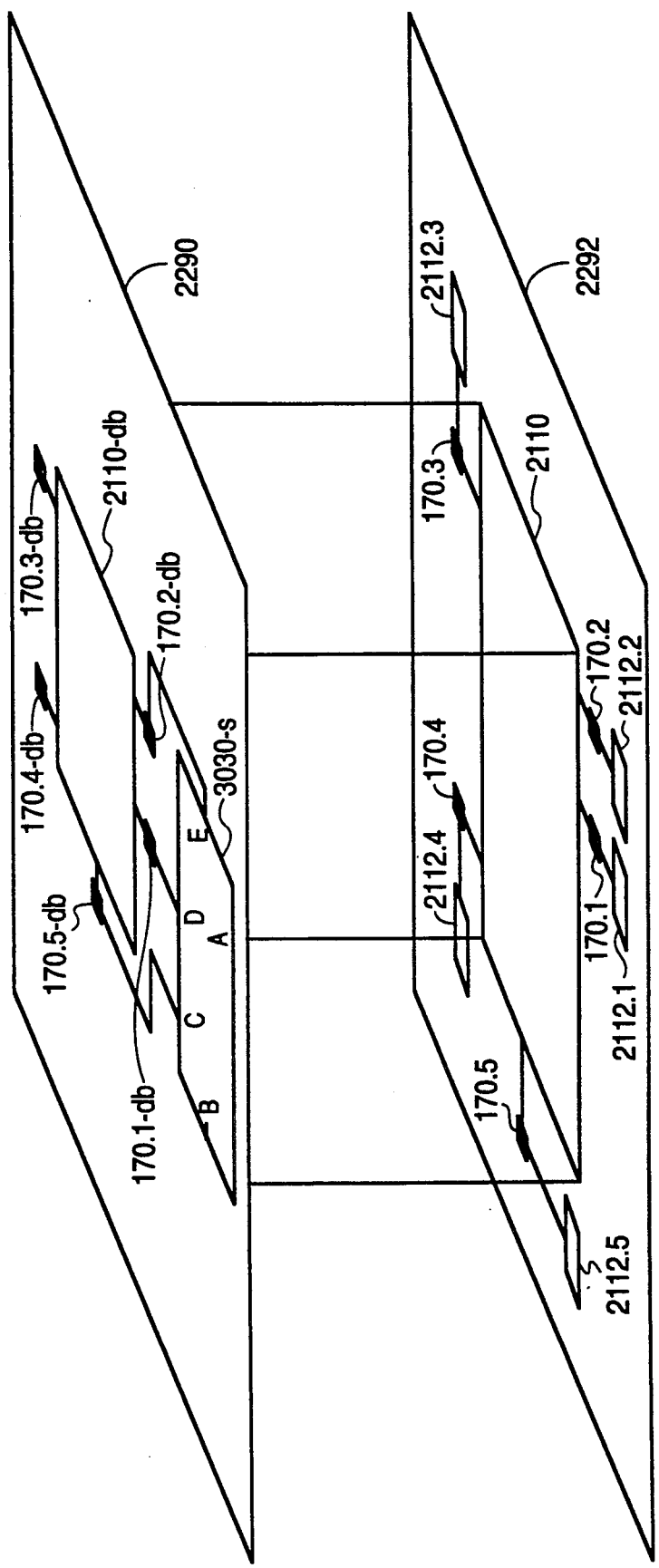
FIG. 22A is a block diagram of an emulation system of the present invention.

FIG. 22A illustrates daughter board 2290 replacing integrated circuit 2110 of the main printed circuit board (PCB) 2292 during emulation. Integrated circuit 2110 is either removed or placed in dead mode. The dead mode is described above in connection with FIG. 6. Daughter board 2290 includes another integrated circuit 2110-db which is a copy of integrated circuit 2110. If integrated circuit 2110 is removed, integrated circuit 2110 can be placed into daughter board 2290 instead of integrated circuit 2110-db.

Emulator 3030 plugs into socket 3030-s in daughter board 2290. Ports A through E of the emulator are connected to the respective ports A through E of socket 3030-s.

The emulator is connected to integrated circuit 2110-db as shown in FIG. 22. Pins 170.1-db through 170.5-db correspond to pins 170.1 through 170.5 of FIG. 22. Pin 170.1 of the main board 2292 corresponds to pin 3050.1 of FIG. 22. Pin 170.5 of PCB 2292 corresponds to pin 3050.5 of FIG. 22. Devices 2112.i remain on PCB 2292 during emulation.

Another emulation technique is to plug into socket 3030-s a discrete version of microcontroller 120.1 rather than the emulator.

Thus microcontroller 120.1 in the integrated circuit 2110 of FIG. 22 can be emulated by the same emulator 3030 that is used for a discrete, non-embedded microcontroller. The need for an emulator emulating the whole integrated circuit 2110 is eliminated. The need for discrete devices to replace function blocks 120.2, 120.3, 120.4 is also eliminated. The same or identical function blocks 120.2, 120.3, 120.4 are used in the normal and the emulation modes. High degree of precision during emulation is thereby provided because this architecture allows a good emulation of the normal-mode operation of circuit 2110.

Figure 23:
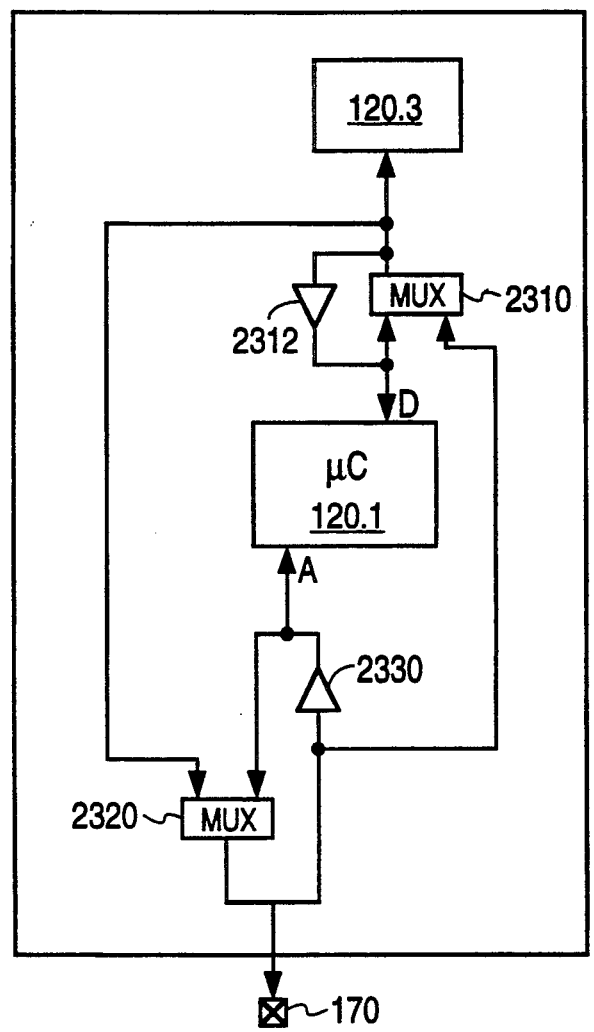
FIGS. 23 and 24 are block diagrams of integrated circuits which diagrams illustrate the present invention.

FIG. 23 illustrates an example in which the microcontroller 120.1 has a bidirectional node D. In normal mode, node D is connected to function block 120.3. External pin 170 is connected to bidirectional node A of microcontroller 120.1.

In emulation mode, the connection to node D is brought out to pin 170 for connection to the emulator (not shown in FIG. 23).

This functionality is achieved as follows. In normal mode, multiplexer 2310 selects node D. The output signals on node D are passed through multiplexer 2310, and the input signals to node D are passed by buffer 2312. Multiplexer 2320 selects node A. Hence the output signals from node A are passed to pin 170. The input signals are passed to node A through buffer 2330.

In emulation mode, multiplexer 2310 deselects node D and instead passes signals from pin 170. Multiplexer 2320 deselects node A and instead passes signals from function block 120.3.

In FIG. 23, pin 170 is a bidirectional pin in both the normal and the emulation modes. Generally, however, pin 170 can be a configurable pin, like pin 170 of FIG. 4, so as to provide different types of I/O in normal and emulation modes. For example, in some embodiments, pin 170 is configured as an input pin in normal mode and as an output pin in emulation mode.

Microcontroller tri-state output nodes are treated for emulation in the same way as non-tri-state output nodes.

For example, in FIG. 22 node D of microcontroller 120.1 can be either a non-tri-state output node or a tri-state output node.

Figure 24:
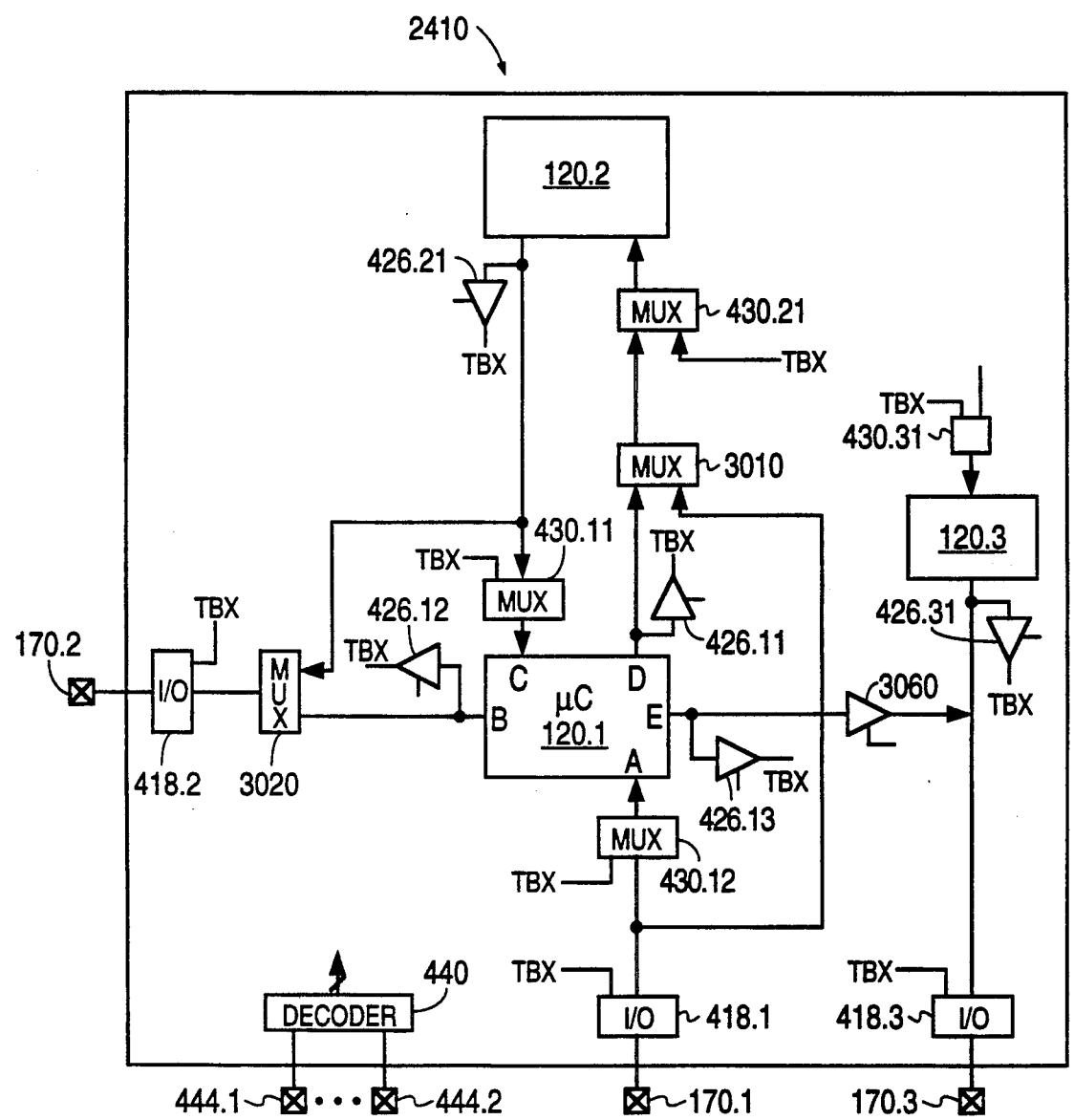

FIG. 24 illustrates an integrated circuit 2410 having both the test bus and the emulation circuitry. Function block 120.1 is a microcontroller. The emulation circuitry affects only the normal mode connections and does not affect the test bus connections. Microcontroller 120.1 has an input port A connected to a test bus line through multiplexer 430.12 (test bus connections are shown as "TBX"). The multiplexer selects the test bus line in test mode. The multiplexer selects the pin 170.1 (through I/O buffer 418.1) in normal mode and in emulation mode. Similarly, multiplexer 430.11 multiplexes a test bus line and a normal-mode connection to input node C of microcontroller 120.1. Tri-state buffers 426.11, 426.12 and 426.13 controllably connect respective output nodes D, B and E to test bus lines.

Function block 120.2 has an output node connected to the test bus through tri-state buffer 426.21. Function block 120.2 has an input node connected to the test bus through multiplexer 430.21. Function block 120.3 has an output node connected to the test bus through tri-state buffer 426.31. This output node is also connected to I/O buffer 418.3 and from there to external pin 170.3. Function block 120.3 has an input node connected to the test bus through multiplexer 430.31.

In emulation mode, the test bus circuitry is configured as in normal mode. In particular, BUNRI=0 (see Table 1 above). Hence the tri-state buffers 426.ij connecting the nodes to the test bus are disabled, and multiplexers 430.ij select the normal connections. I/O buffers 418.i also select the normal connections under the control of signals SPT, LKT (FIG. 6).

In emulation mode, the input signals on node C of microcontroller 120.1 are brought to external pin 170.2 through multiplexer 3020. Multiplexer 3020 is controlled by decoder 440. The output signals on node D are blocked in favor of the signals on pin 170.1 which are brought in through multiplexer 3010. The output signals on node E are blocked by tri-state buffer 3060. Decoder 440 generates control signals for emulation-mode multiplexers 3010, 3020, tri-state buffer 3060, multiplexers 430.ij and tri-state buffers 426.ij. Decoder 440 also generates signals SPT, LKT controlling I/O buffers 418.i.

Similar test and emulation circuitry is provided for tri-state output nodes and bidirectional nodes, if any, of the function blocks. More particularly, the test circuitry and the emulation circuitry described above for such nodes are combined so that the emulation circuitry is connected in the normal-mode signal path.

In some embodiments, microcontroller 120.1 is emulated without desoldering the integrated circuit from the circuit board, as described above in connection with FIG. 22A. A daughter board is used which has another copy of the same integrated circuit and which also has a socket for an emulator. The daughter board is connected to the same connections as the integrated circuit in the main board. The integrated circuit in the main board is put in dead mode or removed so as not to interfere with the emulation.

Figure 1:
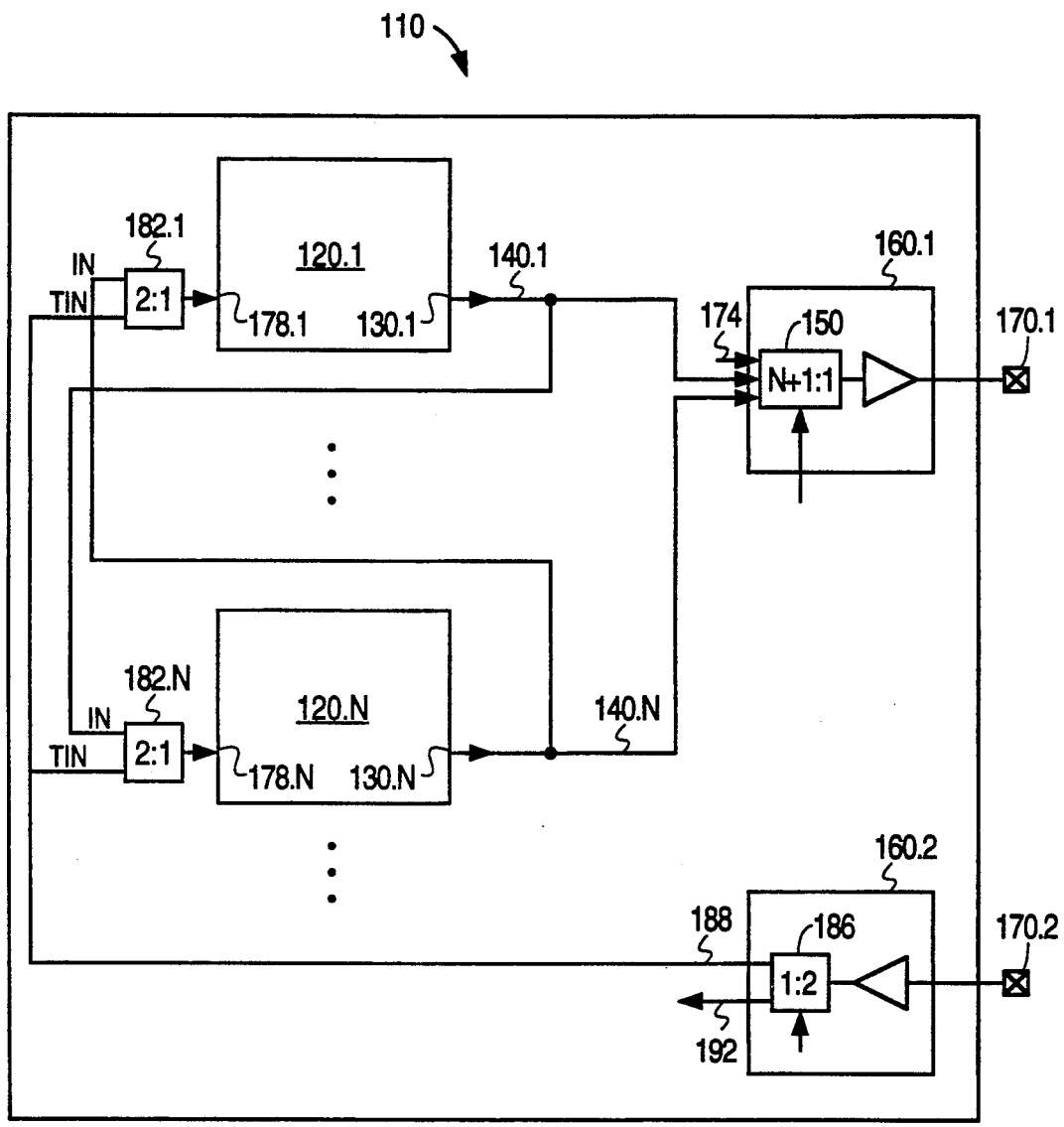
FIGS. 1-3 are block diagrams of prior art integrated circuits.
Figure 2:
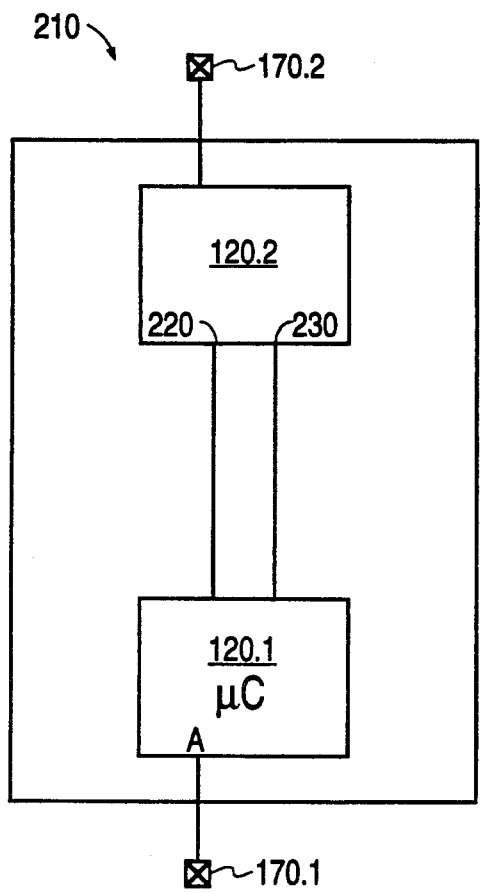
Figure 3:
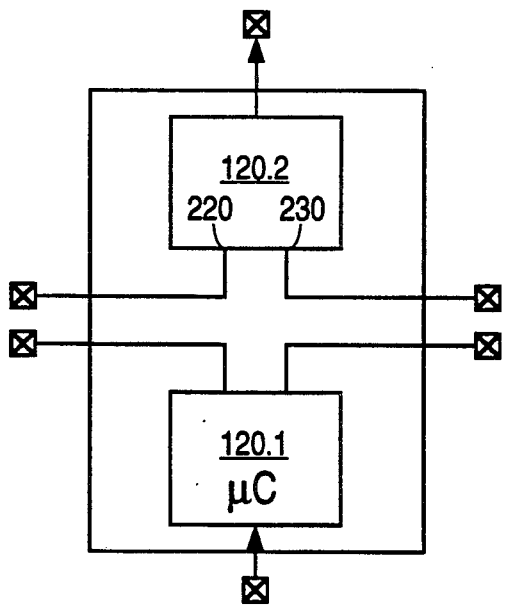

While the invention has been illustrated by the embodiments described above, the description above is not intended to limit the scope of the invention. In particular, the invention can be used with CMOS, TTL and other technologies. In some embodiments, not all function blocks are connected to the test bus. The function blocks not connected to the test bus are tested using other techniques such as, for example, the "muxed I/O" technique illustrated in FIG. 1. In some integrated circuits including more than one microcontrollers, all the microcontrollers embedded in the circuit are provided with the emulation circuitry so that each microcontroller can be emulated separately using an appropriate emulator. In other embodiments, fewer than all microcontrollers are provided with the emulation circuitry. Some features of the invention are illustrated in "CB-C7 0.8-Micron CMOS Cell-Based ASIC Design Manual" (NEC Corporation, Jun. 1992) available from NEC Corporation of Mountain View, Calif. and incorporated herein by reference. Other embodiments and variations fall within the scope of the invention, which is defined by the following claims.

We claim:

1. A circuit having a normal mode and a test mode and comprising:
   one or more external pins;
   a plurality of function blocks, each block having one or more I/O nodes, at least one of said I/O nodes of said blocks being for providing output signals and being inaccessible in normal mode from any external pin of said integrated circuit;
   one or more lines for interconnecting said nodes and said external pins in normal mode;
   one or more test bus lines for accessing in test mode at least some of said I/O nodes from the external pins; and
   for at least one node which is for providing output signals and which in normal mode is inaccessible from any external pin, a tri-state buffer having an input connected to said node and an output connected to one of said test bus lines, said tri-state buffer being always disabled in normal mode, and in test mode said tri-state buffer being enabled during a function block test to allow an output signal on said node to be provided through said one of said test bus lines to an external pin.

2. The circuit of claim 1, further comprising an I/O buffer which in normal mode connects one of said external pins to at least one of said lines for interconnecting said nodes and said external pins,
   said I/O buffer in test mode connecting said at least one of said external pins to the test bus line to which the output of the tri-state buffer is connected.

3. A circuit comprising:
   a plurality of function blocks wherein at least one function block M of said blocks is programmable, each function block having one or more I/O nodes;
   one or more external pins for accessing at least some of said I/O nodes; and
   means for connecting in normal mode an I/O node N1 of said programmable function block M to an I/O node N2 of another function block but not to any external pin of said circuit, and for connecting in normal mode an I/O N3 of said programmable block M to an external pin P of said circuit bus not to any I/O node of any function block other than M, said means being for connecting said node N2 to said pin P in emulation mode.

4. An integrated circuit comprising:
   a plurality of interconnected function blocks such that at least one of said function blocks is programmable; and one or more external pins connected to one or more of said function blocks, wherein at least one programmable block M in said circuit can be emulated by an emulator, and said emulator can be connected to said circuit so as to form a system having the same functionality as the normal-mode functionality of said integrated circuit but with the functions of said programmable block M being assumed by said emulator.

5. An integrated circuit comprising:
one or more external pins;
a function block M; and
a circuitry connected to said function block M and having a node which in normal mode is not connected to any external pin of said integrated circuit, wherein said integrated circuit has an emulation mode in which a circuit E emulating said function block M can be connected to said integrated circuit so as to form a system emulating said integrated circuit so that the functions of said block M are assumed by said circuit E while said circuitry functions as in said normal mode.

6. The integrated circuit of claim 5 wherein:
at least one I/O node of said block M is connected in said normal mode to one of said external pins but not to said circuitry;
at least one node of said circuitry is connected in said normal mode to said function block M but not to any external pin of said integrated circuit; and
every node of said circuitry which node in the normal mode is connected to block M but not to any external pin, is connected during emulation of said block M to an external pin which in said normal mode is connected to block M but not to said circuitry.

7. The integrated circuit of claim 6 wherein a number of I/O nodes of said function block M which nodes in said normal mode are connected to said circuitry but not to any external pin is not greater than the number of the external pins which in said normal mode are connected to said block M but not to said circuitry.

8. A method for emulating an integrated circuit which comprising a function block M and one or more other function blocks wherein said block M has an I/O node N1 connected in a normal mode to one or more of other function blocks but not to any external pin of the integrated circuit, said method comprising the steps of:
putting said integrated circuit into an emulation mode;
connecting said integrated circuit to an emulator which emulates said function block M; and
operating said integrated circuit and said emulator so that said emulator emulates said function block M while every function block other than M operates as in said normal mode.

9. The method of claim 8 wherein:
said step of putting said circuit into an emulation mode comprises the steps of:
selecting an external pin of said integrated circuit; and
for every I/O node N of every function block other than M such that said node N is connected in the normal mode to said I/O node N1 of said block M, connecting said node N to the selected external pin; and
said step of connecting said integrated circuit to said emulator comprises the step of connecting said selected external pin to a node of said emulator which node emulates said I/O node N1 of said block M.

10. The method of claim 9 wherein in the normal mode said selected external pin is connected to said function block M but not to any other function block of said integrated circuit.

11. An integrated circuit having a normal mode and a test mode TM1, said integrated circuit comprising:
an external pin P;
an internal node N1; and
a configurable I/O buffer for connecting said node N1 to said pin P in said test mode TM1,
wherein in one of said modes (normal mode, test mode TM1) said I/O buffer is configured as one of types (output, tri-state output, bidirectional), and
in the other one of said modes (normal mode, test mode TM1) and I/O buffer is configured to be of an input type.

12. The integrated circuit of claim 11 wherein said I/O buffer is configured to be:
of the input type in said normal mode; and
of the output type in said test mode TM1;

13. The integrated circuit of claim 11 wherein said I/O buffer is configured to be:
of the output type in said normal mode; and
of the input type in said test mode TM1.

14. The integrated circuit of claim 11 wherein said I/O buffer is configured to be:
of the tri-state output type in said normal mode; and
of the input type in said test mode TM1.

15. The integrated circuit of claim 11 wherein said I/O buffer is configured to be:
of the bidirectional type in said normal mode; and
of the input type in said test mode TM1.

16. The integrated circuit of claim 11 further having a leakage current test mode in which said I/O buffer tri-states said pin P.

17. The integrated circuit of claim 11 further comprising a programmable function block, said circuit having an emulation mode for emulating said programmable function block,
wherein in said emulation mode said I/O buffer is configured to be of the same type as in said normal mode.

18. The integrated circuit of claim 11 further comprising a programmable function block, said circuit having an emulation mode for emulating said programmable function block,
wherein in said emulation mode said I/O buffer is configured as one of types (input, output, tri-state output, bidirectional), and
wherein in said emulation mode said I/O buffer is configured to be of a different type than in said normal mode.

19. The integrated circuit of claim 11 further comprising a node N2 connected to said pin P in said normal mode,
wherein said integrated circuit has a test mode TM2 in which said node N2 is also connected to said pin P.

20. A method for operating an integrated circuit which comprises an external pin P and an I/O buffer connected to said external pin P, said method comprising the steps of:
in one of modes (normal mode, test mode TM1), configuring said I/O buffer as one of types (output, tri-state output, bidirectional); and
in the other one of said modes (normal mode, test mode TM1), configuring said I/O buffer to be of an input type.

21. The method of claim 20 wherein said I/O buffer is configured to be:
of the input type in said normal mode; and
of the output type in said test mode TM1.

22. The method of claim 20 wherein said I/O buffer is configured to be:
of the output type in said normal mode; and
of the input type in said test mode TM1.

23. The method of claim 20 wherein said I/O buffer is configured to be:
of the tri-state output type in said normal mode; and
of the input type in said test mode TM1.

24. The method of claim 20 wherein said I/O buffer is configured to be:
of the bidirectional type in said normal mode; and
of the input type in said test mode TM1.

25. The method of claim 20 further comprising the steps of:
tri-stating said pin P; and
measuring a leakage current on said pin P.

26. The method of claim 20 wherein said integrated circuit comprises a programmable function block and a circuitry connected to said programmable function block, said method further comprising the steps of:
putting said integrated circuit into an emulation mode in which said I/O buffer is configured as in said normal mode;
connecting to said integrated circuit an emulator of said programmable function block; and
emulating said integrated circuit so that said emulator emulates said programmable function block while said circuitry functions as in said normal mode.

27. The method of claim 20 wherein said integrated circuit further comprises a programmable function block, said method further comprising the steps of:
putting said integrated circuit into an emulation mode in which said I/O buffer is configured as one of types (input, output, tri-state output, bidirectional) and of a different type than in said normal mode;
connecting to said integrated circuit an emulator of said programmable function block; and
emulating said integrated circuit so that said emulator emulates said programmable function block while said circuitry functions as in said normal mode.

28. A method for testing interconnections in an integrated circuit which comprises: (1) one or more nodes not connected in a normal mode to any external pin, and (2) a programmable function block, said method comprising the steps of:
connecting said integrated circuit to a memory so as to connect said programmable function block to said memory; and
causing said programmable function block to execute a program stored in said memory which program causes said programmable function block to exercise interconnections of said integrated circuit.

* * * * *